H. M. SHEER.
FIRELESS COOKER.
APPLICATION FILED JULY 14, 1909.

1,056,595.

Patented Mar. 18, 1913.

2 SHEETS—SHEET 1.

Witnesses
Lloyd W. Patch
A. A. Hammond

Inventor
Henry M. Sheer
By Vernon C. Hodges
his Attorney

H. M. SHEER.
FIRELESS COOKER.
APPLICATION FILED JULY 14, 1909.
1,056,595.
Patented Mar. 18, 1913.
2 SHEETS—SHEET 2.
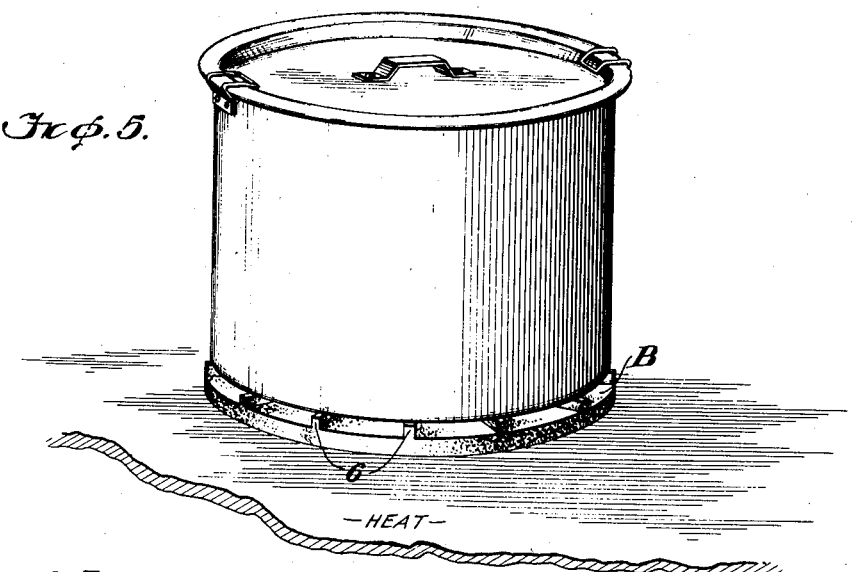
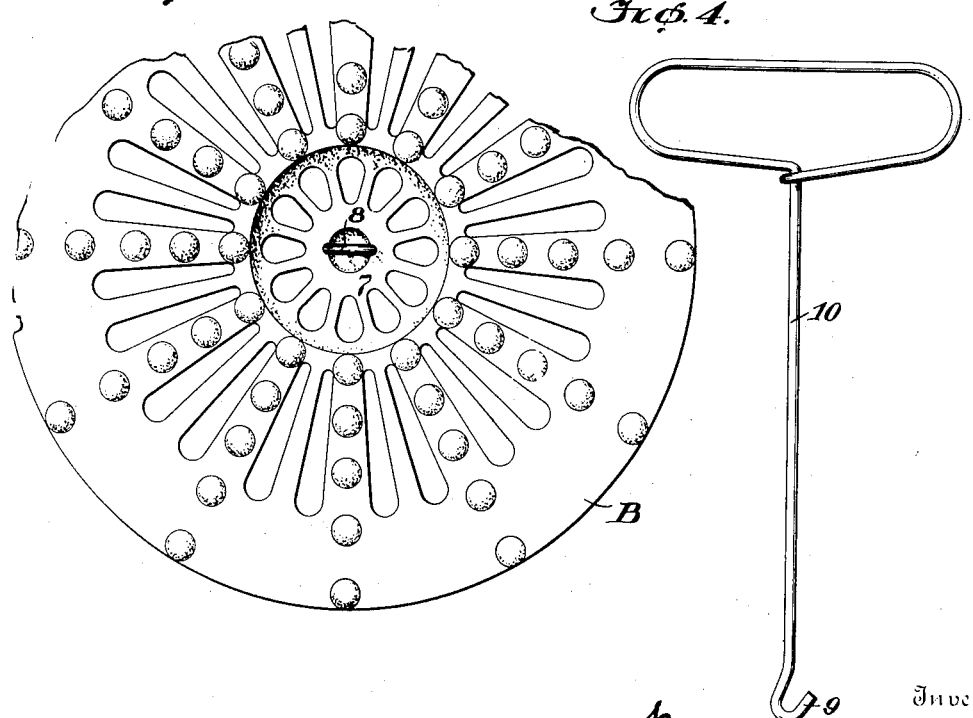

UNITED STATES PATENT OFFICE.

HENRY M. SHEER, OF QUINCY, ILLINOIS, ASSIGNOR TO THE ACME FIRELESS COOKER CO., OF QUINCY, ILLINOIS, A CORPORATION OF ILLINOIS.

FIRELESS COOKER.

1,056,595.  Specification of Letters Patent.  Patented Mar. 18, 1913.

Application filed July 14, 1909. Serial No. 507,572.

*To all whom it may concern:*

Be it known that I, HENRY M. SHEER, a citizen of the United States, residing at Quincy, in the county of Adams and State of Illinois, have invented certain new and useful Improvements in Fireless Cookers, of which the following is a specification.

My invention relates to an improvement in fireless cookers, and the object is to provide an article of this type which will require less fuel and application of initial heat than hitherto.

This present invention consists in a portable, perforated, heating element, either of metal or other heat-retaining material, such for instance, as soapstone, fire-clay, or the like, in connection with an oven or ovens in which the element is placed after being heated, together with the cooker vessel, the contents of which is heated along with the heating element, and a telescoping bell or cover adapted to fit the oven or ovens and surround and inclose the heating element and cooker vessel.

My invention further consists in certain novel features of construction and combinations of parts which will be hereinafter described and pointed out in the claim.

Figure 1:
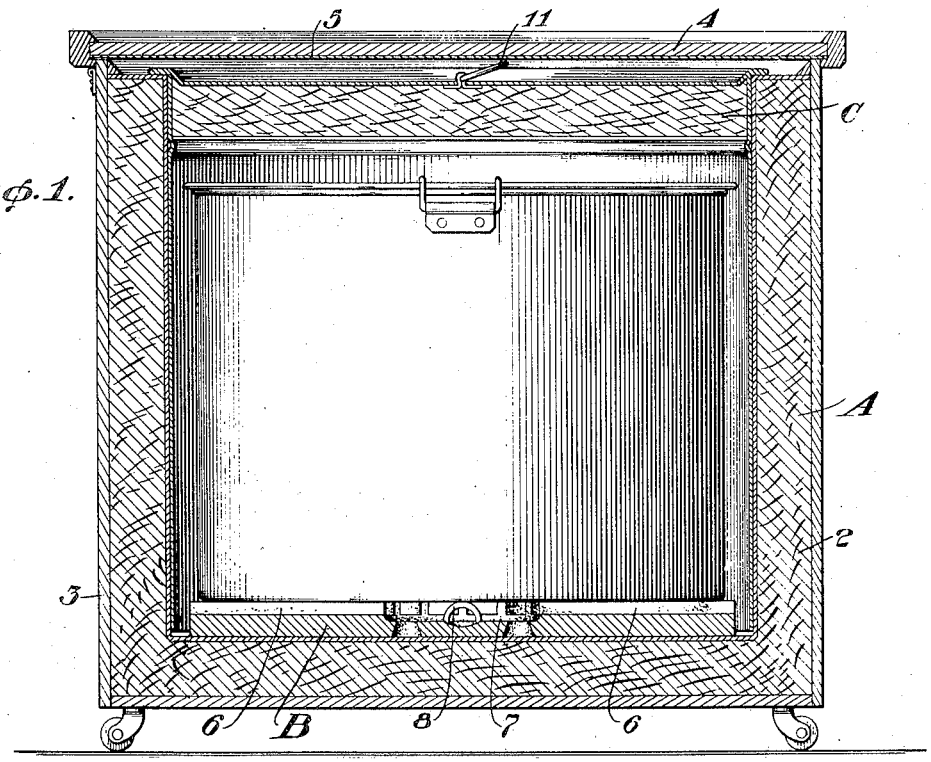
Figure 2:
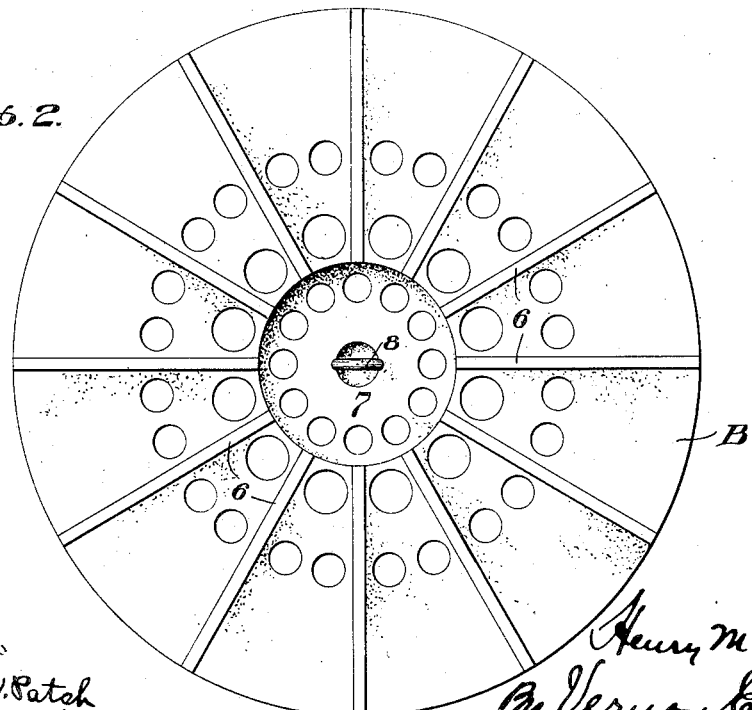

In the accompanying drawings:—Figure 1 is a sectional view through the cooker, Fig. 2 is a view of the portable heating element, Fig. 3 is a fragmentary view of another form of heating element, Fig. 4 is a view of the lifter for introducing and removing the heating element, and Fig. 5 is a view of a portion of a gas stove and a burner with my improved heating element and a cooker vessel thereon, in position to receive their initial heat.

A, represents the oven. This is preferably of cylindrical form and lined with sheet metal, the same being insulated by means of mineral wool or other non-conducting and heat-resisting material. The oven may be located in a box or frame 3, mounted on casters as illustrated, and a hinged cover 4 at the top is adapted to close down over the box or frame, this cover also preferably being lined with sheet metal 5.

B, is the heating element. This may be made of metal, soapstone, fire brick, or other like heat-absorbing material, although I find metal is best for my purposes for obvious reasons, as it not only absorbs heat quickly, but also discharges it more rapidly than the soapstone. However, the fact that soapstone does not discharge heat as quickly as the metal makes the soapstone less efficient in properly browning the food which is being cooked or baked. In its preferred form, this heating element is not only perforated to permit the heat to pass through readily while it is being heated, but also it is provided with radial ribs 6, 6, or lugs or bosses in lieu thereof, whereon to support the cooker vessel sufficiently above the perforations to admit of a circulation of the heat thereunder and around the same. This plate is preferably depressed a trifle through the center as at 7, and is provided with a loop 8 adapted to receive the hook 9 on the end of the lifter 10 when the heating element is to be lifted into place.

C, is the cover. This conforms in shape to the side walls of the oven, and is adapted to fit and telescope therein, its upper portion being filled with insulating material to prevent the escape of heat, and having a flange at the top adapted to close down over the top of the oven. A ring 11 at the top affords means for removing and re-placing the telescopic cover or bell. When the cover or bell is placed in the oven or ovens, the heat from the heating element as well as the steam which may be generated is retained therein, or in other words, prevented from wasting. Its greatest efficiency is attained by placing the heating element over the flame of a gas or gasolene, or other stove, together with the cooker vessel containing the food to be prepared, which latter is placed on top of the heating element resting on the flanges or projections. This allows space for the heat to pass up through the perforations, coming in contact with the cooker vessel, and then passing out in the space provided by the flanges, lugs, or bosses. In this manner, both the cooker vessel and the heating element are heated at one and the same time. When things have reached the boiling point, the heating element is placed in the bottom of the oven, and the cooker vessel then set on top, and the bell or cover is placed in position. The heat absorbed by the perforated plate will quickly heat up the oven, and keeps the food in the cooker vessel practically at the boiling point for ten or fifteen minutes, after being placed in the cooker, with the result that the cooking may be completed in the fireless cooker in about the same length of time necessary to complete the cooking on the stove, thus saving all this additional waste of fuel, and the attendant heat, so objectionable in the summer season. For roasting and baking, where two of these heating elements are required, both of them may be heated at one and the same time over the same burner, and in addition to this, the vessel containing the food can also be heated at the same time by placing it on top of the two elements, thus saving fuel.

Even more than two of the heating elements might be used if the character of cooking required.

More or less slight changes might be resorted to in the form and arrangement of the several parts described, without departure from the spirit and scope of my invention, and hence I do not wish to limit myself to the exact construction herein set forth, but:—

Having fully described my invention, what I claim as new and desire to secure by Letters Patent, is:—

In a fireless cooker, a heat absorbing element made in a single piece of metal with radial elevations extending at intervals from the center to the periphery and provided with orifices extending therethrough at points between said elevations whereby a maximum heat absorbing and radiating surface is presented, and having means at its center whereby it may be lifted.

In testimony whereof I affix my signature, in the presence of two witnesses.

HENRY M. SHEER.

Witnesses:
GERHARD G. ARENDS,
J. M. WINTERS.